United States Patent
Cur et al.

(10) Patent No.: US 9,874,394 B2
(45) Date of Patent: *Jan. 23, 2018

(54) METHOD OF MAKING A FOLDED VACUUM INSULATED STRUCTURE

(71) Applicant: Whirlpool Corporation, Benton Harbor, MI (US)

(72) Inventors: Nihat Cur, Saint Joseph, MI (US); Axel Julio Ramm, Saint Joseph, MI (US); Guolian Wu, Saint Joseph, MI (US); James Kendall, Mount Prospect, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/635,313

(22) Filed: Mar. 2, 2015

(65) Prior Publication Data
US 2015/0176888 A1 Jun. 25, 2015

Related U.S. Application Data

(62) Division of application No. 13/837,659, filed on Mar. 15, 2013, now Pat. No. 8,986,483.

(Continued)

(51) Int. Cl.
*F25D 23/06* (2006.01)
*F25D 23/02* (2006.01)
(Continued)

(52) U.S. Cl.
CPC .......... *F25D 23/065* (2013.01); *B23P 15/26* (2013.01); *B29C 53/00* (2013.01); *F25B 39/00* (2013.01); *F25B 39/02* (2013.01); *F25C 1/00* (2013.01); *F25D 11/00* (2013.01); *F25D 23/028* (2013.01); *F25D 23/062* (2013.01); *F25D 23/063* (2013.01); *H04R 3/12* (2013.01); *F25D 2201/14* (2013.01); *Y10T 29/49002* (2015.01);

(Continued)

(58) Field of Classification Search
None
See application file for complete search history.

(56) References Cited

U.S. PATENT DOCUMENTS

| | | |
|---|---|---|
| 948,541 A | 2/1910 | Coleman |
| 1,275,511 A | 8/1918 | Welch |

(Continued)

FOREIGN PATENT DOCUMENTS

| | | |
|---|---|---|
| CA | 1320631 | 7/1993 |
| CA | 2259665 | 1/1998 |

(Continued)

OTHER PUBLICATIONS

Machine Translation of JP 07-098090, Feb. 16, 2017.*

(Continued)

Primary Examiner — Barbara J Musser
(74) Attorney, Agent, or Firm — Price Heneveld LLP

(57) ABSTRACT

A vacuum insulated cabinet structure includes panels having sheet metal outer side walls and polymer inner side walls. The polymer inner side walls are heat-sealed to a layer of polymer material laminated to a flat sheet metal blank to form vacuum cavities. The blank is then bent along fold lines to form a cabinet structure.

20 Claims, 10 Drawing Sheets

Related U.S. Application Data

(60) Provisional application No. 61/618,914, filed on Apr. 2, 2012.

(51) Int. Cl.

| | |
|---|---|
| *F25B 39/00* | (2006.01) |
| *F25D 11/00* | (2006.01) |
| *B29C 53/00* | (2006.01) |
| *H04R 3/12* | (2006.01) |
| *B23P 15/26* | (2006.01) |
| *F25B 39/02* | (2006.01) |
| *F25C 1/00* | (2006.01) |

(52) U.S. Cl.
CPC .... *Y10T 29/49359* (2015.01); *Y10T 29/49616* (2015.01); *Y10T 29/49826* (2015.01); *Y10T 29/49879* (2015.01); *Y10T 29/49947* (2015.01); *Y10T 156/1051* (2015.01); *Y10T 428/231* (2015.01)

(56) References Cited

U.S. PATENT DOCUMENTS

| | | |
|---|---|---|
| 1,849,369 A | 3/1932 | Frost |
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,538,780 A | 1/1951 | Hazard |
| 2,559,356 A | 7/1951 | Hedges |
| 2,729,863 A * | 1/1956 | Kurtz .................. F25D 23/062 220/592.09 |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,635,536 A | 1/1972 | Lackey et al. |
| 3,688,384 A | 9/1972 | Mizushima et al. |
| 3,868,829 A | 3/1975 | Mann et al. |
| 3,875,683 A | 4/1975 | Waters |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,242,241 A | 12/1980 | Rosen et al. |
| 4,303,732 A | 12/1981 | Torobin |
| 4,325,734 A | 4/1982 | Burrage et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,660,271 A | 4/1987 | Lenhardt |
| 4,671,909 A | 6/1987 | Torobin |
| 4,671,985 A | 6/1987 | Rodrigues et al. |
| 4,745,015 A | 5/1988 | Cheng et al. |
| 4,777,154 A | 10/1988 | Torobin |
| 4,805,293 A | 2/1989 | Buchser |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito |
| 5,082,335 A | 1/1992 | Cur et al. |
| 5,094,899 A | 3/1992 | Rusek, Jr. |
| 5,118,174 A | 6/1992 | Benford et al. |
| 5,157,893 A | 10/1992 | Benson et al. |
| 5,168,674 A | 12/1992 | Molthen |
| 5,175,975 A | 1/1993 | Benson et al. |
| 5,212,143 A | 5/1993 | Torobin |
| 5,221,136 A | 6/1993 | Hauck et al. |
| 5,231,811 A | 8/1993 | Andrepont et al. |
| 5,248,196 A | 9/1993 | Lynn et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,387,759 A | 2/1995 | Usa |
| 5,418,055 A | 5/1995 | Chen et al. |
| 5,433,056 A | 7/1995 | Benson et al. |
| 5,477,676 A | 12/1995 | Benson et al. |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,562,154 A | 10/1996 | Benson et al. |
| 5,586,680 A | 12/1996 | Dellby et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell et al. |
| 5,792,801 A | 8/1998 | Tsuda et al. |
| 5,813,454 A | 9/1998 | Potter |
| 5,827,385 A | 10/1998 | Meyer et al. |
| 5,843,353 A | 12/1998 | DeVos et al. |
| 5,866,228 A | 2/1999 | Awata |
| 5,868,890 A | 2/1999 | Fredrick |
| 5,900,299 A | 5/1999 | Wynne |
| 5,924,295 A | 7/1999 | Park |
| 5,952,404 A | 9/1999 | Simpson et al. |
| 5,966,963 A | 10/1999 | Kovalske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,294,595 B1 | 9/2001 | Tyagi et al. |
| 6,305,768 B1 | 10/2001 | Nishimoto |
| 6,390,378 B1 | 5/2002 | Briscoe et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,460,955 B1 | 10/2002 | Vaughan et al. |
| 6,623,413 B1 | 9/2003 | Wynne |
| 6,651,444 B2 | 11/2003 | Morimoto et al. |
| 6,716,501 B2 | 4/2004 | Kovalchuk et al. |
| 6,736,472 B2 | 5/2004 | Banicevic |
| 6,749,780 B2 | 6/2004 | Tobias |

(56) References Cited

U.S. PATENT DOCUMENTS

| | | |
|---|---|---|
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,026,054 B2 | 4/2006 | Ikegawa et al. |
| 7,210,308 B2 | 5/2007 | Tanimoto et al. |
| 7,234,247 B2 | 6/2007 | Maguire |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,703,217 B2 | 4/2010 | Tada et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 8,083,985 B2 | 12/2011 | Luisi et al. |
| 8,113,604 B2 | 2/2012 | Olson et al. |
| 8,117,865 B2 | 2/2012 | Allard et al. |
| 8,163,080 B2 | 4/2012 | Meyer et al. |
| 8,176,746 B2 | 5/2012 | Allard et al. |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,343,395 B2 | 1/2013 | Hu et al. |
| 8,353,177 B2 | 1/2013 | Adamski et al. |
| 8,453,476 B2 | 6/2013 | Kendall et al. |
| 8,456,040 B2 | 6/2013 | Allard et al. |
| 8,522,563 B2 | 9/2013 | Allard et al. |
| 8,528,284 B2 | 9/2013 | Aspenson et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,756,952 B2 | 6/2014 | Adamski et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,927,084 B2 | 1/2015 | Jeon et al. |
| 8,944,541 B2 | 2/2015 | Allard et al. |
| 8,986,483 B2 | 3/2015 | Cur et al. |
| RE45,501 E | 5/2015 | Maguire |
| 9,102,076 B2 | 8/2015 | Doshi et al. |
| 9,140,480 B2 | 9/2015 | Kuehl et al. |
| 9,328,951 B2 | 5/2016 | Shin et al. |
| 9,463,917 B2 | 10/2016 | Wu et al. |
| 2002/0168496 A1 | 11/2002 | Morimoto et al. |
| 2003/0008100 A1 | 1/2003 | Horn |
| 2004/0178707 A1 | 9/2004 | Avendano |
| 2004/0180176 A1 | 9/2004 | Rusek |
| 2004/0253406 A1 | 12/2004 | Hayashi et al. |
| 2005/0235682 A1 | 10/2005 | Hirai et al. |
| 2006/0076863 A1 | 4/2006 | Echigoya et al. |
| 2006/0201189 A1 | 9/2006 | Adamski et al. |
| 2006/0263571 A1 | 11/2006 | Tsunetsugu et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0179541 A1 | 7/2009 | Smith et al. |
| 2009/0324871 A1 | 12/2009 | Henn |
| 2010/0170279 A1 | 7/2010 | Aoki |
| 2010/0231109 A1 | 9/2010 | Matzke et al. |
| 2010/0293984 A1 | 11/2010 | Adamski et al. |
| 2010/0295435 A1 | 11/2010 | Kendall et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0315693 A1 | 12/2011 | Cur et al. |
| 2012/0000234 A1 | 1/2012 | Adamski et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0273111 A1 | 11/2012 | Nomura et al. |
| 2012/0279247 A1 | 11/2012 | Katu et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0068990 A1 | 3/2013 | Eilbracht et al. |
| 2013/0111941 A1 | 5/2013 | Yu et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0305535 A1 | 11/2013 | Cur et al. |
| 2014/0132144 A1 | 5/2014 | Kim et al. |
| 2014/0171578 A1 | 6/2014 | Meyer et al. |
| 2014/0260332 A1 | 9/2014 | Wu |
| 2014/0346942 A1 | 11/2014 | Kim et al. |
| 2014/0364527 A1 | 12/2014 | Wintermantel et al. |
| 2015/0027628 A1 | 1/2015 | Cravens et al. |
| 2015/0147514 A1 | 5/2015 | Shinohara et al. |
| 2015/0168050 A1 | 6/2015 | Cur et al. |
| 2015/0190840 A1 | 7/2015 | Muto et al. |
| 2016/0240839 A1 | 8/2016 | Umeyama et al. |
| 2016/0258671 A1 | 9/2016 | Allard et al. |

FOREIGN PATENT DOCUMENTS

| | | |
|---|---|---|
| CA | 2640006 A1 | 8/2007 |
| CN | 1158509 | 7/2004 |
| CN | 1970185 | 5/2007 |
| CN | 100359272 | 1/2008 |
| CN | 101437756 A | 5/2009 |
| CN | 201680116 | 12/2010 |
| CN | 102296714 A | 12/2011 |
| CN | 102452522 | 5/2012 |
| CN | 102717578 A | 10/2012 |
| CN | 102720277 A | 10/2012 |
| CN | 103072321 A | 5/2013 |
| CN | 203331442 U | 12/2013 |
| CN | 104816478 A | 8/2015 |

(56) References Cited

FOREIGN PATENT DOCUMENTS

| | | |
|---|---|---|
| DE | 1150190 B | 6/1963 |
| DE | 4110292 A1 | 10/1992 |
| DE | 19818890 | 11/1999 |
| DE | 19915311 A1 | 10/2000 |
| DE | 102008026528 A | 5/2009 |
| DE | 102009046810 A | 5/2009 |
| DE | 102010024951 | 12/2011 |
| DE | 102011051178 A1 | 12/2012 |
| DE | 102012223536 A1 | 6/2014 |
| DE | 102012223541 A1 | 6/2014 |
| EP | 02609699 A2 | 9/1987 |
| EP | 0260699 A2 | 3/1988 |
| EP | 0480451 A1 | 4/1992 |
| EP | 0691518 A | 1/1996 |
| EP | 0691518 A1 | 10/1996 |
| EP | 0860669 A1 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1484563 B1 | 1/2008 |
| EP | 2342511 | 8/2012 |
| EP | 2607073 A2 | 6/2013 |
| EP | 2789951 A1 | 10/2014 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 03013779 | 1/1991 |
| JP | 06159922 | 6/1994 |
| JP | 7001479 | 1/1995 |
| JP | 07098090 A * | 4/1995 ............. F16L 59/04 |
| JP | 07167377 | 4/1995 |
| JP | 08300052 | 11/1996 |
| JP | 08303686 A | 11/1996 |
| JP | 09166271 A1 | 6/1997 |
| JP | 10113983 | 5/1998 |
| JP | 11311395 A | 11/1999 |
| JP | 11336990 | 12/1999 |
| JP | 2000097390 | 4/2000 |
| JP | 2000117334 | 4/2000 |
| JP | 2001038188 A | 2/2001 |
| JP | 2001116437 A | 4/2001 |
| JP | 2001336691 A | 12/2001 |
| JP | 2001343176 | 12/2001 |
| JP | 03478771 | 12/2003 |
| JP | 2004303695 | 10/2004 |
| JP | 2005114015 A | 4/2005 |
| JP | 2005164193 | 6/2005 |
| JP | 2005256849 A | 9/2005 |
| JP | 2006077792 A | 3/2006 |
| JP | 2006161945 | 6/2006 |
| JP | 03792801 B2 | 7/2006 |
| JP | 2006200685 A | 8/2006 |
| JP | 2007263186 | 10/2007 |
| JP | 4111096 B2 | 7/2008 |
| JP | 2008157431 A | 7/2008 |
| JP | 2009063064 A | 3/2009 |
| JP | 2009162402 | 7/2009 |
| JP | 2009524570 A | 7/2009 |
| JP | 2010017437 | 1/2010 |
| JP | 2010071565 A | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 A | 4/2011 |
| JP | 04779684 B2 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012189114 A | 10/2012 |
| JP | 2012242075 | 12/2012 |
| JP | 2013002484 A | 1/2013 |
| JP | 2013050242 | 3/2013 |
| JP | 2013050242 A | 3/2013 |
| JP | 2013088036 | 5/2013 |
| JP | 2013195009 A | 9/2013 |
| KR | 20020057547 | 7/2002 |
| KR | 20020080938 A | 10/2002 |
| KR | 20030083812 A | 11/2003 |
| KR | 20040000126 | 1/2004 |
| KR | 100620025 B1 | 9/2006 |
| KR | 1020070044024 A | 4/2007 |
| KR | 1020080103845 | 11/2008 |
| KR | 20090026045 | 3/2009 |
| KR | 1017776 B1 | 2/2011 |
| KR | 20120007241 | 1/2012 |
| KR | 2012046621 | 5/2012 |
| KR | 2012051305 | 5/2012 |
| RU | 2077411 C1 | 4/1997 |
| RU | 2132522 C1 | 6/1999 |
| RU | 2252377 | 5/2005 |
| RU | 2349618 C2 | 3/2009 |
| RU | 2571031 | 12/2015 |
| SU | 00476407 A1 | 7/1975 |
| SU | 01307186 A1 | 4/1987 |
| WO | 9849506 A1 | 11/1998 |
| WO | 9920964 | 4/1999 |
| WO | 9920964 A1 | 4/1999 |
| WO | 0160598 | 8/2001 |
| WO | 0202987 | 1/2002 |
| WO | 0252208 | 4/2002 |
| WO | 02060576 A1 | 8/2002 |
| WO | 03089729 A1 | 10/2003 |
| WO | 2006045694 | 5/2006 |
| WO | 2007085511 A1 | 8/2007 |
| WO | 2008122483 A2 | 10/2008 |
| WO | 2009013106 A2 | 1/2009 |
| WO | 2009112433 A1 | 9/2009 |
| WO | 2009147106 A1 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 A2 | 11/2010 |
| WO | 2011003711 | 1/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 A1 | 3/2012 |
| WO | 2012043990 A2 | 4/2012 |
| WO | 2012044001 A2 | 4/2012 |
| WO | 2012085212 A2 | 6/2012 |
| WO | 2012119892 A1 | 9/2012 |
| WO | 2014038150 A1 | 3/2014 |
| WO | 2014095542 A1 | 6/2014 |
| WO | 2014184393 A1 | 11/2014 |
| WO | 2016082907 A1 | 6/2016 |

OTHER PUBLICATIONS

International Patent Application No. PCT/US2013036203, filing date: Apr. 11, 2013, Applicant: Whirlpool Corporation, International Search Report and Opinion dated Jul. 26, 2013.

European Patent Application No. 14158608.1 filed Mar. 10, 2014, Applicant: Whirlpool Corporation, European Search re: same, dated Oct. 14, 2014.

European Patent Application No. 14158619.8 filed Mar. 10, 2014, Applicant: Whirlpool Corporation. European extended search report, dated Jun. 22, 2015, re: same.

(56) References Cited

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

European Patent Application No. 15154577.9, Search Report, dated Jul. 20, 2015, 8 pages.

European Patent Application No. 14158619, Search Report, dated Jun. 22, 2015, 9 pages.

European Patent Application No. 15153481, Search Report, dated Jul. 10, 2015, 6 pages.

European Patent Application No. 13775196.2, Supplemental Search Report, dated Dec. 7, 2015, 10 pages.

KitchenAid, "Refrigerator user instructions," Sep. 5, 2015, 120 pages.

International Search Report, Application No. PCT/US2016/020896, dated May 12, 2016. 3 pages.

European Search Report, Application No. 4158615.6, dated Jun. 24, 2015, 5 pages.

International Searching Authority, "Search Report," issued in connection with International Patent Application No. PCT/US2016/062479, dated Feb. 9, 2017, 8 pages.

International Searching Authority, "Search Report," issued in connection with International Patent Application No. PCT/US2016/060947, dated Feb. 2, 2017, 8 pages.

International Searching Authority, "Search Report," issued in connection with International Patent Application No. PCT/US2016/061125, dated Jan. 12, 2017, 9 pages.

International Searching Authority, "Search Report," issued in connection with International Patent Application No. PCT/US2016/062453, dated Feb. 9, 2017, 8 pages.

International Searching Authority, "Search Report," issued in connection with International Patent Application No. PCT/US2016/061790, dated Jan. 26, 2017, 8 pages.

International Searching Authority, "Search Report," issued in connection with International Patent Application No. PCT/US2016/062029, dated Jan. 26, 2017, 8 pages.

International Searching Authority, "Search Report," issued in connection with International patent Application No. PCT/US2016/060961, dated Feb. 2, 2017, 9 pages.

International Search Report, International Application No. PCT/US2016/060519, dated Mar. 16, 2017, 10 pages.

International Search Report, International Application No. PCT/US2016/062804, dated Feb. 27, 2017, 9 pages.

International Search Report, International Application No. PCT/US2016/063023, dated Mar. 30, 2017, 7 pages.

International Search Report, International Application No. PCT/US2016/063065, dated Apr. 20, 2017, 9 pages.

International Search Report, International Application No. PCT/US2016/063355, dated Feb. 27, 2017, 9 pages.

International Search Report, International Application No. PCT/US2016/063958, dated Mar. 6, 2017, 10 pages.

* cited by examiner

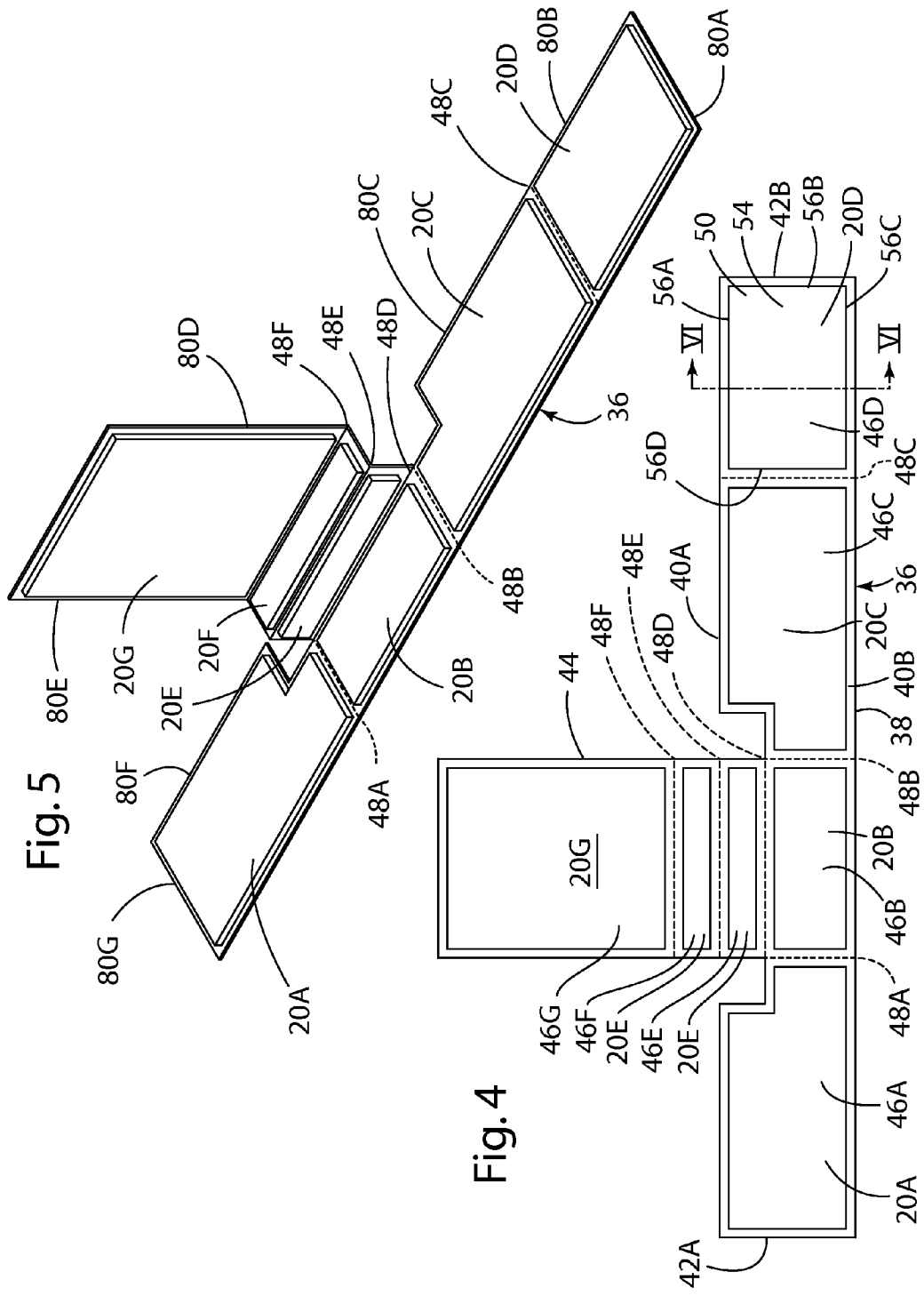

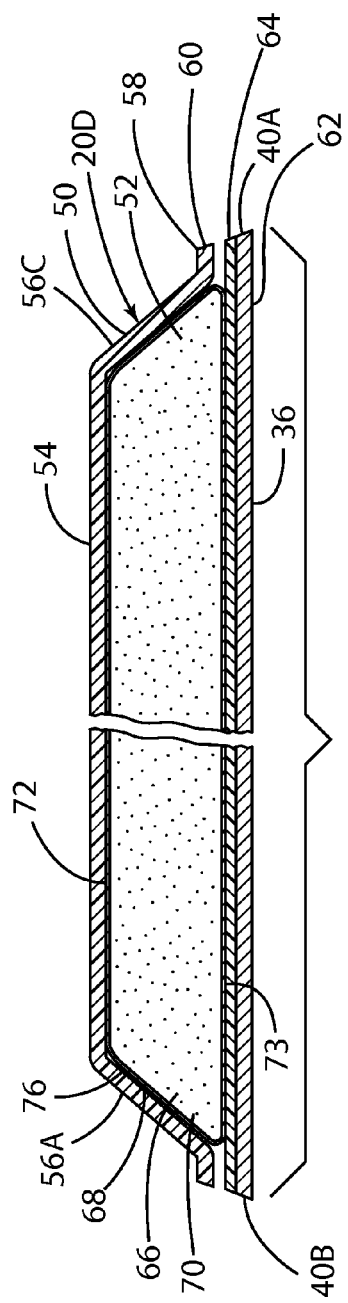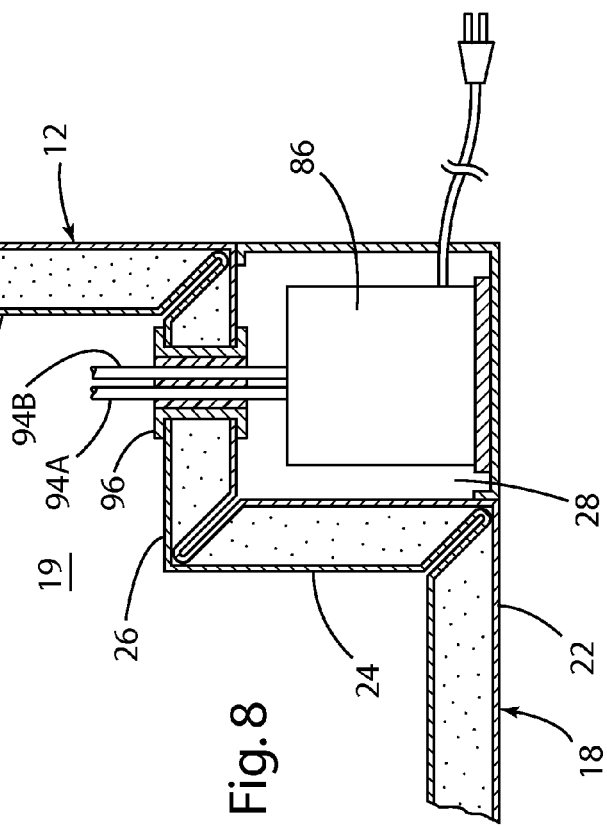

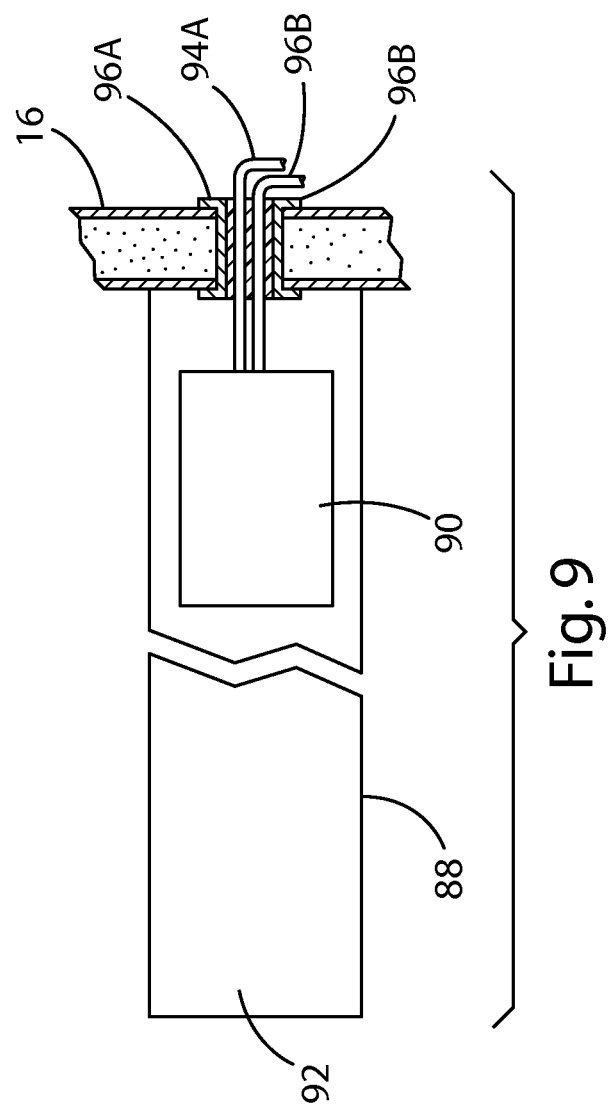

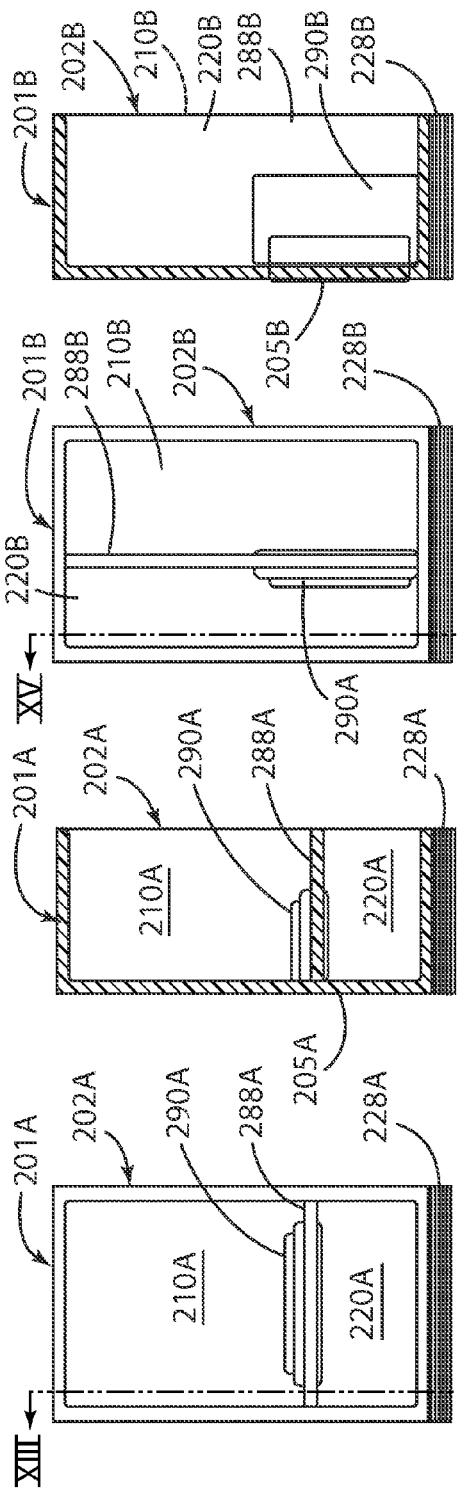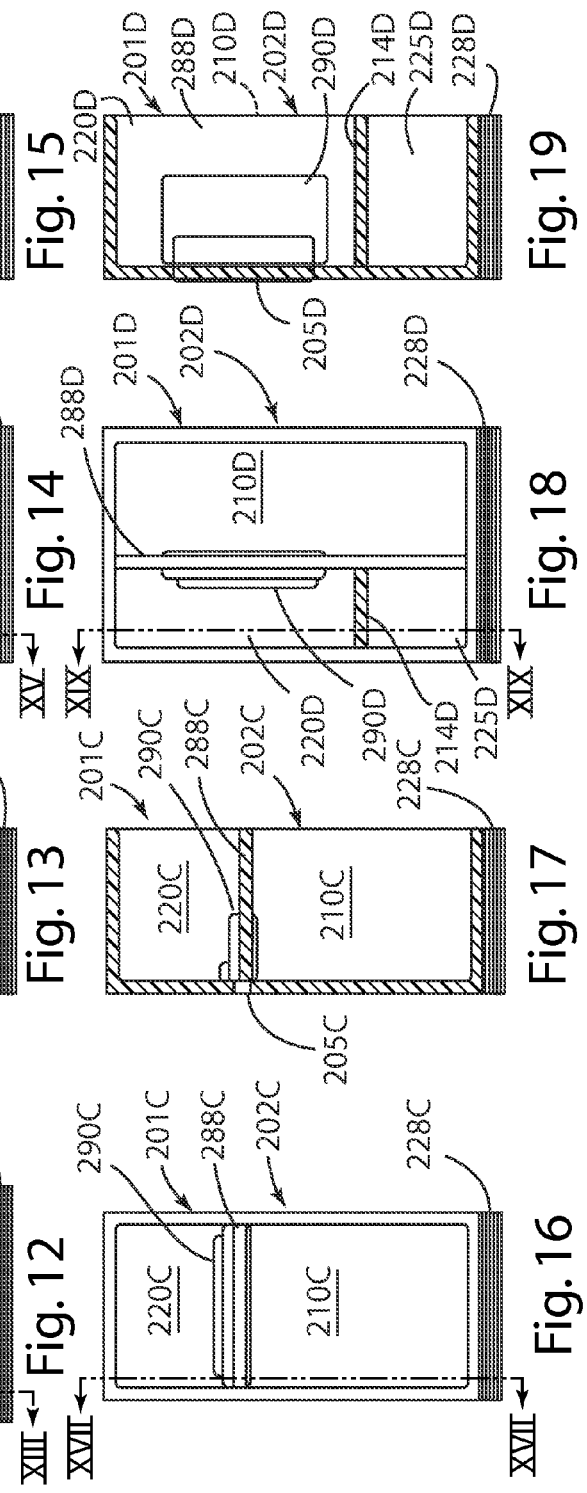

METHOD OF MAKING A FOLDED VACUUM INSULATED STRUCTURE

CROSS-REFERENCE TO RELATED APPLICATIONS

This application is related to U.S. Pat. No. 8,986,483 issued on Mar. 24, 2015, entitled "FOLDED VACUUM INSULATED STRUCTURE.", This application is also related to U.S. patent application Ser. No. 13/833,635 filed Mar. 15, 2013, entitled "A METHOD TO CREATE VACUUM INSULATED CABINETS FOR REFRIGERATORS,"; and U.S. Pat. No. 9,140,481, issued Sep. 12, 2015, entitled "FOLDED VACUUM INSULATED STRUCTURE"; and U.S. Pat. No. 8,944,541 issued Feb. 3, 2015, entitled "A VACUUM PANEL CABINET STRUCTURE FOR A REFRIGERATOR"; and U.S. Pat. No. 9,182,158 issued Nov. 10, 2015, entitled "DUAL COOLING SYSTEMS TO MINIMIZE OFF-CYCLE MIGRATION LOSS IN REFRIGERATORS WITH A VACUUM INSULATED STRUCTURE"; and U.S. Pat. No. 9,038,403, issued May 26, 2015, entitled "VACUUM INSULATED DOOR STRUCTURE AND METHOD FOR THE CREATION THEREOF"; and U.S. Pat. No. 9,071,907 issued Jun. 30, 2015, entitled "VACUUM INSULATED STRUCTURE TUBULAR CABINET CONSTRUCTION"; and U.S. Pat. No. 9,221,210 issued Dec. 29, 2015, entitled "METHOD TO CREATE VACUUM INSULATED CABINETS FOR REFRIGERATORS", all of which are incorporated herein by reference in their entirety.

BACKGROUND OF THE INVENTION

Various types of insulated cabinet structures for refrigerators, freezers, and the like have been developed. Known refrigerator cabinets may include inner and outer side walls with a layer of insulating material such as polyurethane foam disposed between the inner and outer side walls. The foam provides insulation for the cabinet structure. However, known cabinet constructions may suffer from various drawbacks.

SUMMARY OF THE INVENTION

One aspect of the present invention is a method of fabricating a refrigerator having a vacuum insulated cabinet. The method includes forming an outer cabinet skin blank, the blank including an elongated portion having a generally rectangular perimeter with elongated side edges and end edges extending between the side edges. The blank defines a plurality of fold lines extending between the side edges to define a plurality of generally planar panel regions. The outer cabinet skin blank comprises a sheet of material that includes a metal layer and an outer layer of polymer material on a first side of a sheet. The polymer material is preferably a heat sealable thermoplastic polymer material. The method further includes providing a plurality of pouches having porous filler material disposed in the pouches. The pouches are positioned on the first side of the outer cabinet skin blank to cover the panel regions. The method includes providing a barrier layer that forms a barrier with respect to gasses and water vapor sufficient to maintain a vacuum. The barrier layer may comprise EVOH, metal foil, or other suitable material that is laminated with a layer of thermoplastic polymer material. The barrier layer may be sealed to the layer of polymer material around the pouches utilizing a heat seal process, mechanical pressure, adhesives, or other suitable technique. The pouches are thereby sealed inside an air-tight space formed between the layer of heat sealable polymer material and the barrier layer. The method also includes forming a vacuum in the air-tight space, and folding the cabinet skin blank along the fold lines to form a vacuum insulated cabinet structure having upright outer side walls and a transverse wall extending between the outer side walls. The vacuum insulated cabinet structure may include a floor structure having a front portion and a raised rear portion that is elevated relative to the front portion to define an exterior component-mounting space that is separated from the insulated interior space. One or more components of an electrically-powered refrigeration system may be mounted in the component-mounting space.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is a plan view of an outer cabinet skin blank;

FIG. 5 is an isometric view of the cabinet skin blank of FIG. 4 showing the formation of a floor structure and a back panel;

FIG. 6 is a cross-sectional view of the outer cabinet skin blank of FIG. 4 taken along the line VI-VI;

FIG. 8 is an enlarged view of a portion of the refrigerator of FIG. 7;

FIG. 9 is an enlarged view of a portion of the refrigerator of FIG. 7;

FIG. 12 is a front elevational view of a refrigerator cabinet having a divider that includes a cooling module;

FIG. 13 is a cross-sectional view of the insulated cabinet structure of FIG. 12 taken along the line XIII-XIII;

FIG. 14 is a front elevational view of a refrigerator cabinet having a divider wall that includes a cooling module;

FIG. 15 is a cross-sectional view of the insulated cabinet structure of FIG. 14 taken along line XV-XV;

FIG. 16 is a front elevational view of a refrigerator cabinet having a divider that includes a cooling module;

FIG. 17 is a cross-sectional view of the insulated cabinet structure of FIG. 16 taken along line XVII-XVII;

FIG. 18 is a front elevational view of a refrigerator cabinet having a divider that includes a cooling module; and FIG. 19 is a cross-sectional view of the insulated cabinet structure of FIG. 18 taken along the line XIX-XIX.

DETAILED DESCRIPTION

Figure 1:
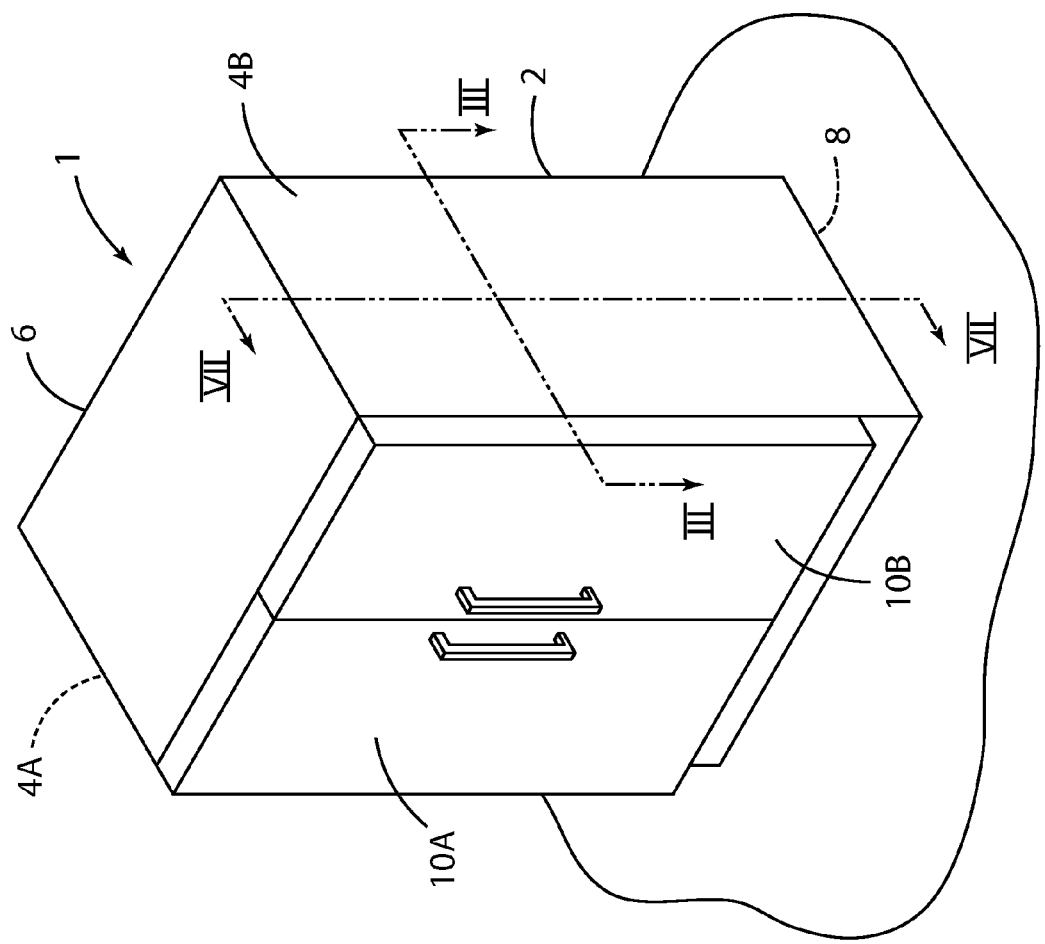
FIG. 1 is an isometric view of a refrigerator having a vacuum insulated cabinet structure according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes a vacuum insulated cabinet structure 2. The vacuum insulated cabinet structure 2 includes upright side walls 4A and 4B, an upper horizontal wall 6, and a generally horizontal lower wall 8 (see also FIG. 2). Doors 10A and 10B are moveably mounted to the cabinet structure 2 in a known manner.

Figure 2:
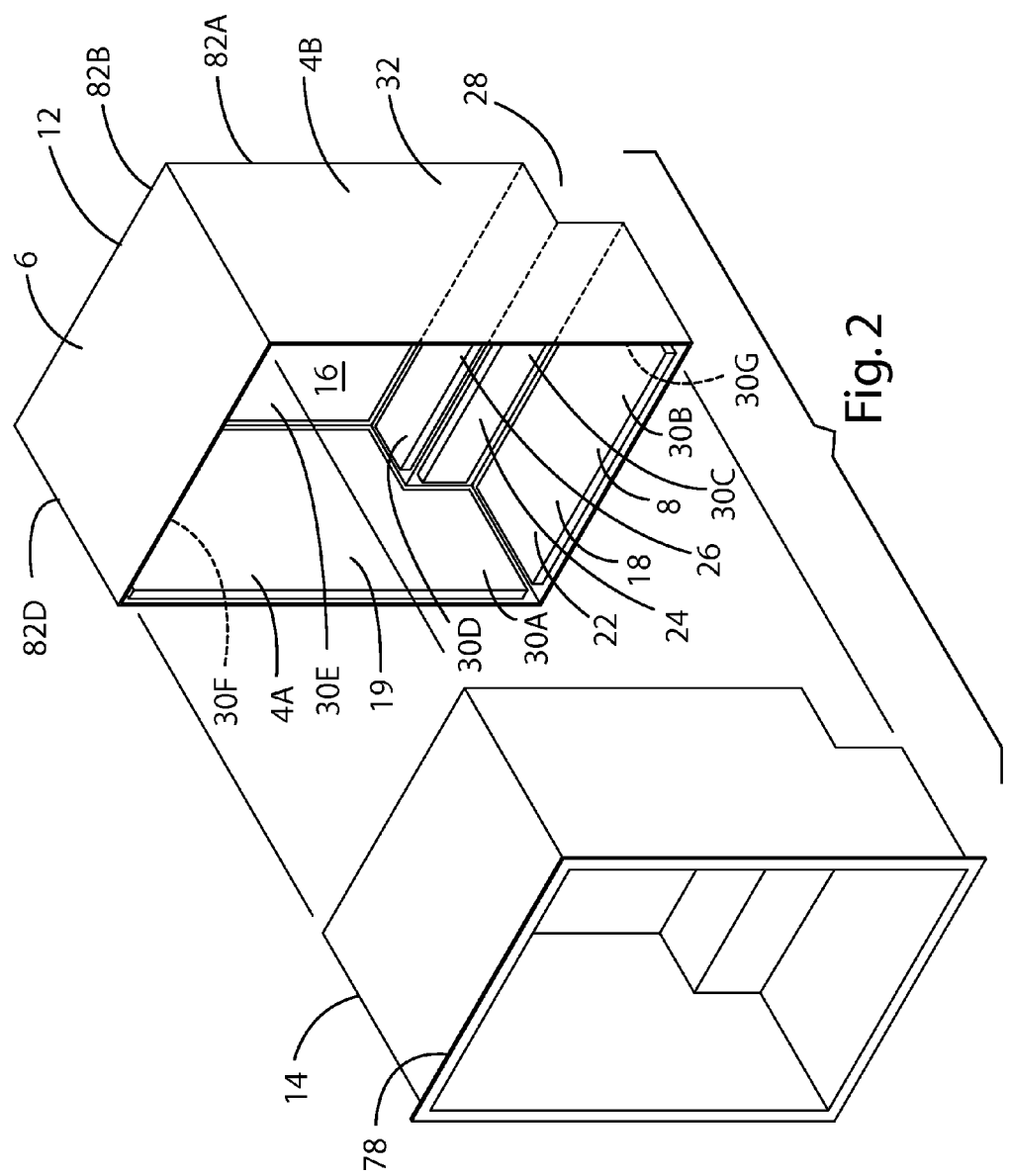
FIG. 2 is an exploded isometric view of a vacuum insulated cabinet structure and liner.

With further reference to FIG. 2, the vacuum insulated cabinet structure 2 may include a first cabinet structure or portion 12 and a liner 14. Liner 14 may be thermoformed from polymer material utilizing known materials and processes. As discussed in more detail below, the first portion 12 comprises sheet metal that is bent to form side walls 4A and 4B, upper horizontal wall 6, floor structure 18, and an optional rear wall 16. The first portion 12 defines an interior space 20 that receives liner 14. Insulating materials such as polyurethane foam may be injected between liner 14 and first portion 12.

As also discussed in more detail below, floor structure 18 includes a horizontal first portion 22, a vertical second portion 24, and a horizontal third portion 26. Third portion 26 is elevated relative to first portion 22 to define an exterior component mounting space 28 that may be utilized to mount a compressor and/or other cooling system components outside of insulated interior space 19 of vacuum insulated cabinet structure 2. The first portion 12 includes a plurality of vacuum insulated panels 30A-30G that are positioned on inner sides of metal outer layer 32 of first portion 12.

Figure 3:
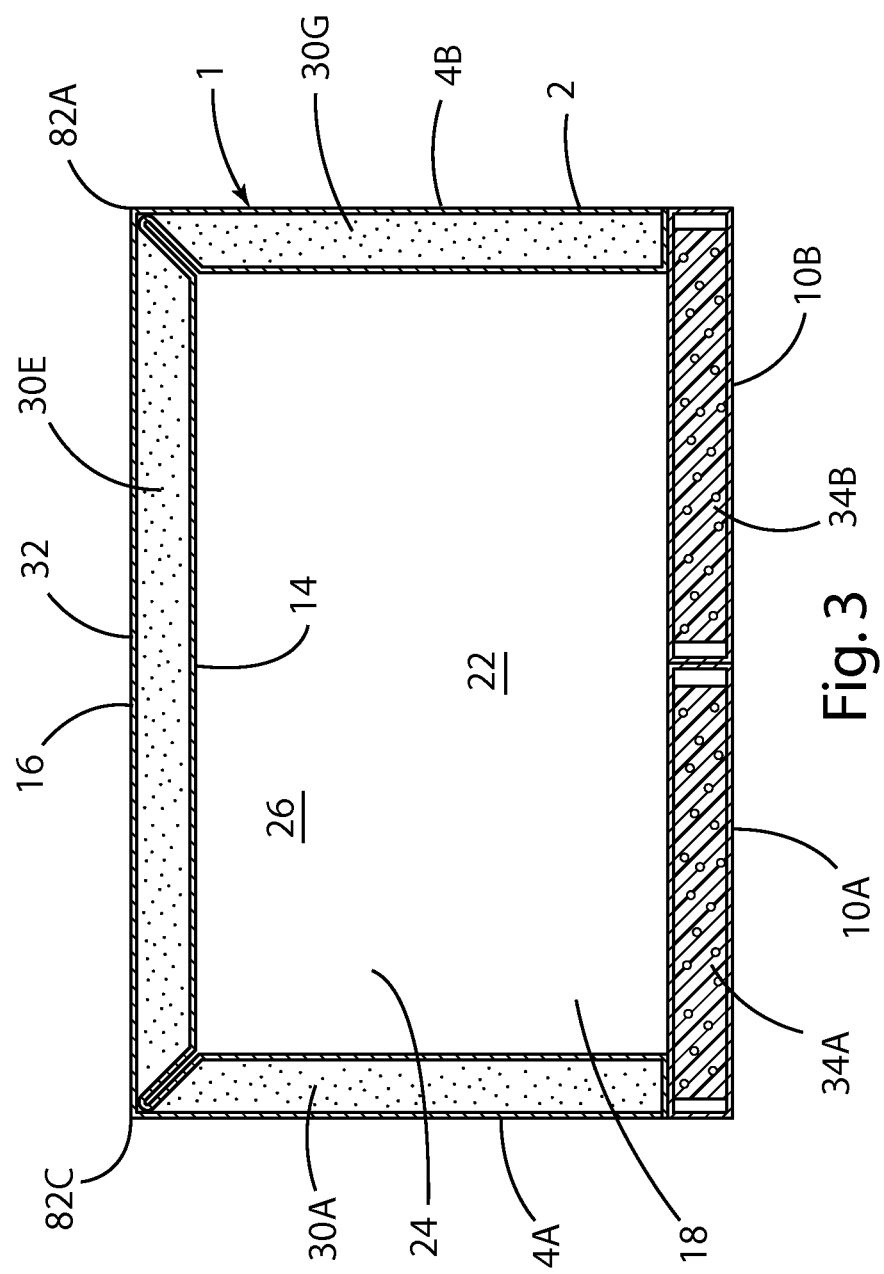
FIG. 3 is a cross-sectional view of the refrigerator of FIG. 1 taken along the line III-III.

With further reference to FIG. 3, the vacuum insulated panels 30A-30G are positioned between metal outer layer 32 of vacuum insulated cabinet structure 2 and the polymer inner liner 14. Doors 10A and 10B may be vacuum insulated in a manner that is substantially similar to the vacuum insulated cabinet structure 2, or the doors 10A and 10B may include a known insulation material suck as foam insulation 34A and 34B.

With reference to FIG. 4, during fabrication of vacuum insulated cabinet structure 2, a layer of sheet metal is cut to form a blank 36 having an elongated rectangular portion 38 defining elongated opposite edges 40A and 40B, and end edges 42A and 42B. The blank 36 may optionally include a transversely-extending portion 44 that is utilized to form rear wall 16 of first portion 12 of vacuum insulated cabinet structure 2.

The blank 36 includes a plurality of panel regions 46A-46G. The blank 36 also defines a plurality of fold lines 48A-48C extending between opposite side edges 40A and 40B to define the boundaries of panel regions 46A-46D. A plurality of fold lines 48D-48F extend between panel regions 46E-46G. It will be understood that the fold lines 48A-48F do not necessarily comprise actual lines marked on blank 36, but rather represent lines where the blank 36 is to be folded. When the blank 36 is in a flat, unfolded condition (FIG. 4), a plurality of vacuum insulated panels 20A-20G are formed on panel regions 46A-46G (see also FIG. 5).

With further reference to FIG. 6, insulated panel 20D includes a polymer retaining structure 50. The polymer retaining structure 50 is preferably thermoformed from a sheet of material that includes one or more layers of a thermoplastic material such as high impact polystyrene that is laminated to a barrier layer. The barrier layer may comprise ethylene vinyl alcohol (EVOH) or other material (e.g. metal foil) that forms a barrier with respect to gasses and water vapor. The barrier layer preferably retains a vacuum in vacuum space 52 sufficient to prevent the thermal conductivity of the insulated panels from exceeding a value that is 200% of an initial value for at least 10 years. The retaining structure 50 includes a planar main wall 54 and transversely extending side walls 56A-56D (see also FIG. 4). The polymer retaining structure 50 includes a flange 60 extending around retaining structure 50 to define a perimeter 58. The perimeter 58 (flange 60) of retaining structure 50 is configured to follow the contours of panel region 46A. It will be understood that the size and shape of each polymer retaining structure 50 depends on the size and shape of the panel region 46A-46G for which the polymer retaining structure 50 is configured.

The blank 36 is formed from a sheet of material having a metal layer 62 comprising low carbon steel or other suitable metal, and a heat sealable polymer layer 64 laminated to the metal layer 62. The polymer retaining structure 50 can be connected to the blank 36 by sealing the flange 60 to polymer layer 64 to thereby form the air-tight interior vacuum space 52. Flange 60 can be sealed to polymer layer 64 utilizing a heat sealing process, mechanical pressure, adhesives, or other suitable process. Prior to sealing polymer retaining structure 50 to blank 36, a plurality of pouches 66 are positioned on the panel regions 46A-46G. Pouches 66 comprise an outer layer 68, and filler material 70 that is disposed inside the outer layer 68. The filler material 70 may comprise silica powder or other suitable filler material of a type used in vacuum insulated panels. The outer layer 68 may comprise paper or other material that permits air to escape from inside the pouch 66, while retaining the filler material 70 inside the pouch 66. In general, the pouches 66 include outer sides 72, inner sides 73 and peripheral edge 76. The pouches 66 are relatively thin, and the edges 76 of the pouches 66 preferably have a shape that conforms to the shape of panel regions 46A-46G.

During fabrication of vacuum insulated cabinet structure 2, the pouches 66 are positioned on panel regions 46A-46G, and polymer retaining structures 50 are positioned over the pouches 66. The entire blank 36 may then be positioned within a vacuum chamber (not shown), and the flanges 60 of the polymer retaining structures 50 are then sealed to the heat sealable polymer layer 64 of blank 36 to form interior vacuum spaces 52, with pouches 66 being disposed within the interior vacuum spaces 52. The blank 36 can then be removed from the vacuum chamber. Although the entire flange 60 of each polymer retaining structure 50 may be sealed to polymer layer 64 in a vacuum chamber, the polymer retaining structure 50 can also be sealed to the polymer layer 64 along only a portion of flange 60 prior to positioning the blank 36 in a vacuum chamber. After the blank 36 is positioned within a vacuum chamber, the previously unsealed portion of flange 60 can then be sealed to polymer layer 64 in a vacuum chamber.

With reference to FIG. 5, after the vacuum insulated panels 20A-20G are formed, the blank 36 is deformed along fold lines 48A-48F to thereby form the first portion 12 (see also FIG. 2) of the vacuum insulated cabinet structure 2. Referring again to FIG. 6, the side walls 56A-56D of polymer retaining structure 50 may be angled inwardly as shown in FIG. 6 at an angle of approximately 45 degrees, such that the side walls 56 of adjacent panel regions 46A-46G are closely fitted against one another after folding of blank 36. However, some of the side walls 56 may be substantially orthogonal to the blank 36 if required. For example, with reference to FIG. 4, the side wall 56C of vacuum insulated panel 20D may be orthogonal because the side wall 56C is not adjacent a fold line, but rather fits closely adjacent a flange 78 (FIG. 2) of liner 14 when assembled.

Referring again to FIG. 5, after the blank 36 is folded along the fold lines 48A-48F, the edges of the blank 36 can be interconnected by welding, deforming, or other suitable process to form corners 82A-82C (FIGS. 2 and 3). Referring again to FIG. 2, liner 14 can then be inserted into space 19 of first portion 12 of vacuum insulated cabinet structure 2. Polyurethane foam or the like may be injected between liner 14 and first cabinet structure 12 to fill gaps that may remain along the edges of vacuum insulated panels 20.

Figure 7:
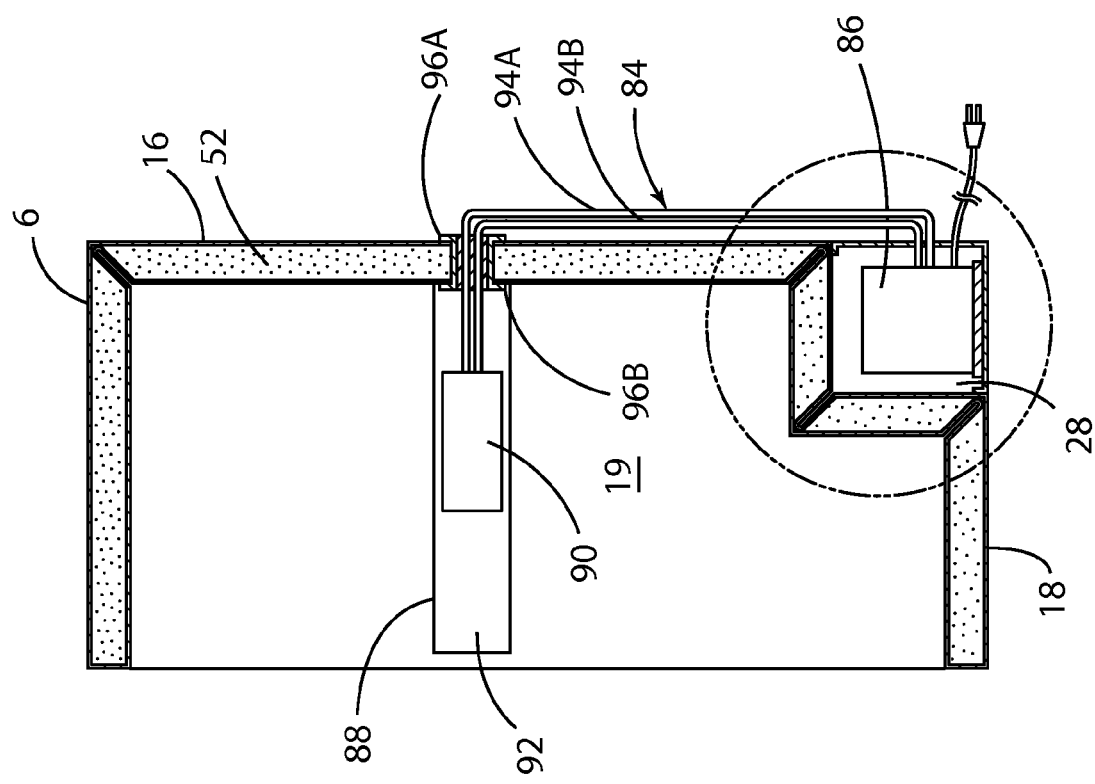
FIG. 7 is a cross-sectional view of the refrigerator of FIG. 1 taken along the line VII-VII.

With further reference to FIGS. 7-9, refrigerator 1 may include a cooling system 84. The cooling system 84 may include an electrically powered compressor 86 and/or other components mounted in exterior component mounting space 28. Refrigerator 1 may also include a divider 88 disposed within interior space 19. Divider 88 is configured to receive mechanical equipment for operating various functions of the refrigerator. As an example, a cooling module 90 may be disposed within interior volume 92 of divider 88 to cool the compartments on opposite sides of divider 88. Examples of various cooling module sets are disclosed in U.S. patent application Ser. No. 13/108,226 entitled "COOLING SYSTEM INTEGRATION ENABLING A PLATFORM ARCHITECTURE" filed on May 16, 2011; U.S. patent application Ser. No. 13/108,293 entitled "FLEXIBLE COOLING SYSTEM INTEGRATION FOR MULTIPLE PLATFORMS" filed on May 16, 2011; and U.S. patent application Ser. No. 13/108,183 entitled "UNIVERSAL AND FLEXIBLE COOLING MODULE SET (CMS) CONFIGURATION AND ARCHITECTURE" filed on May 16, 2011. Each of these patent applications is hereby incorporated by reference in their entirety. The cooling module 90 may be operably connected to compressor 86 and/or other components by utility lines 94A and 94B. The utility lines 94A and 94B pass through rear panel 16 at fittings 96A and 96B, respectively. The fittings 96A and 96B seal off the vacuum space 52 to ensure the space 52 maintains a vacuum. The utility lines 94A and 94B may comprise coolant lines, and cooling module 90 may comprise an evaporator and fan unit. Utility lines 94A and 94B may further comprise electrical lines to provide power for a fan of cooling module 90.

Referring to FIG. 8, utility lines 94A and 94B may also extend through third portion 26 of floor structure 18 at a fitting 96. If the utility lines 94A and 94B are routed into interior space 19 as shown in FIG. 8, the utility lines 94A and 94B may be routed directly adjacent inner surface 98 of first portion 12 of the cabinet structure 2, between liner 14 and one or more insulated panels 20A-20G. As discussed above, polyurethane foam or the like can be injected into the space between liner 14 and vacuum insulated panels 20A-20G. Accordingly, the utility lines 94A and 94B may be embedded in the polyurethane foam.

Figure 10:
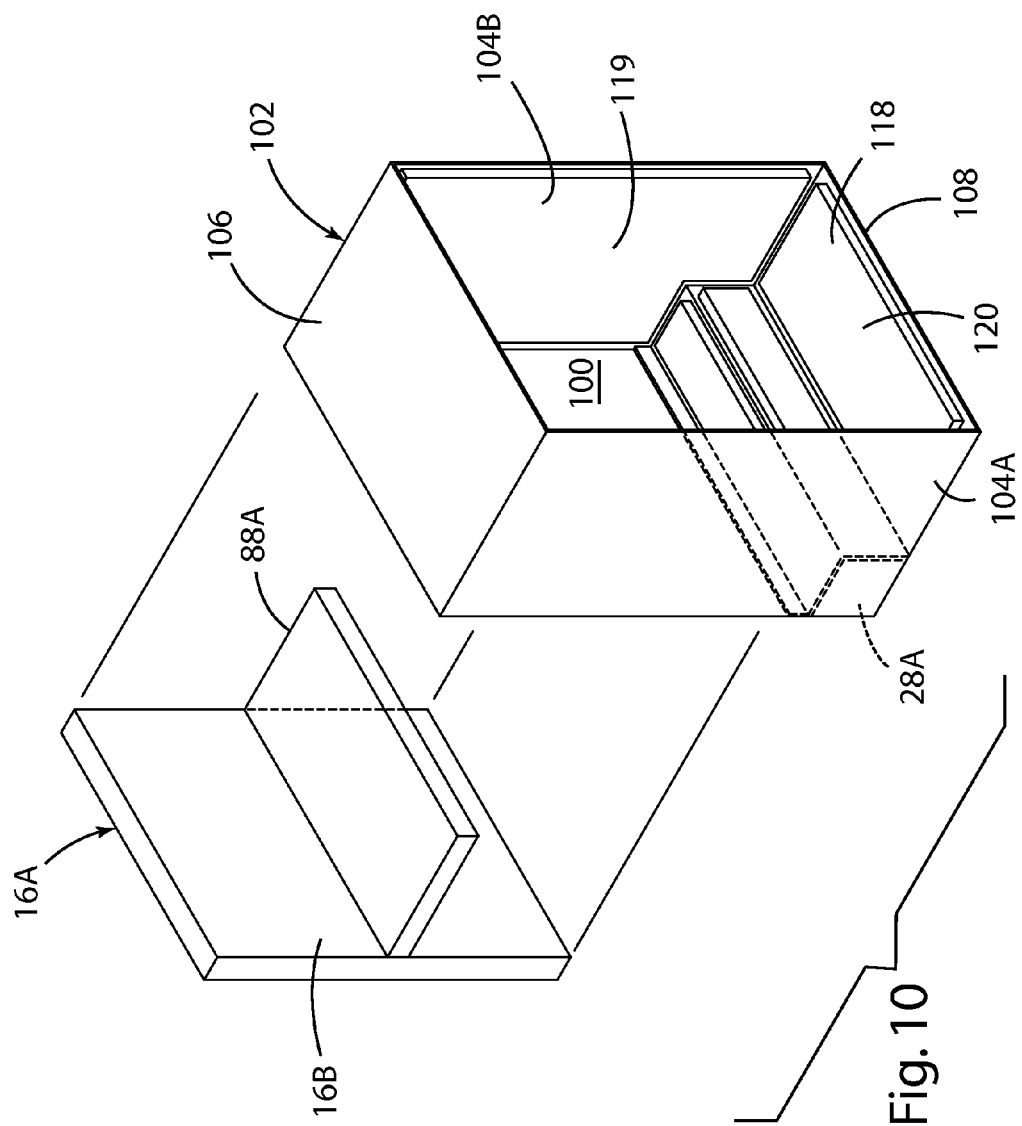
FIG. 10 is an exploded isometric view of a vacuum insulated cabinet structure according to another aspect of the present invention.

With further reference to FIG. 10, a vacuum insulated cabinet structure 102 according to another aspect of the present invention is constructed in a manner that is substantially similar to the vacuum insulated cabinet structure 2 described in more detail above. However, the insulated cabinet structure 102 includes a rear panel assembly 16A having a vertical panel portion 16B that may comprise a vacuum insulated panel, or it may comprise a conventional insulated panel having polyurethane foam disposed internally. Rear panel 16A may include a partition 88A that includes cooling modules (not shown) that are operably connected to a compressor (also not shown) that is disposed in an exterior space 28A. The vacuum insulated cabinet structure 102 may include a plurality of vacuum insulated panels 120 that are substantially similar to the vacuum insulated panels 20A-20G described in more detail above. The vacuum insulated cabinet structure 102 is fabricated in substantially the same manner as described in more detail above in connection with FIGS. 4-6. However, the blank 36 utilized to form vacuum insulated cabinet structure 102 does not include a panel region 46G (FIG. 4), such that an enlarged rear opening 100 is formed in vacuum insulated cabinet structure 102.

Figure 11:
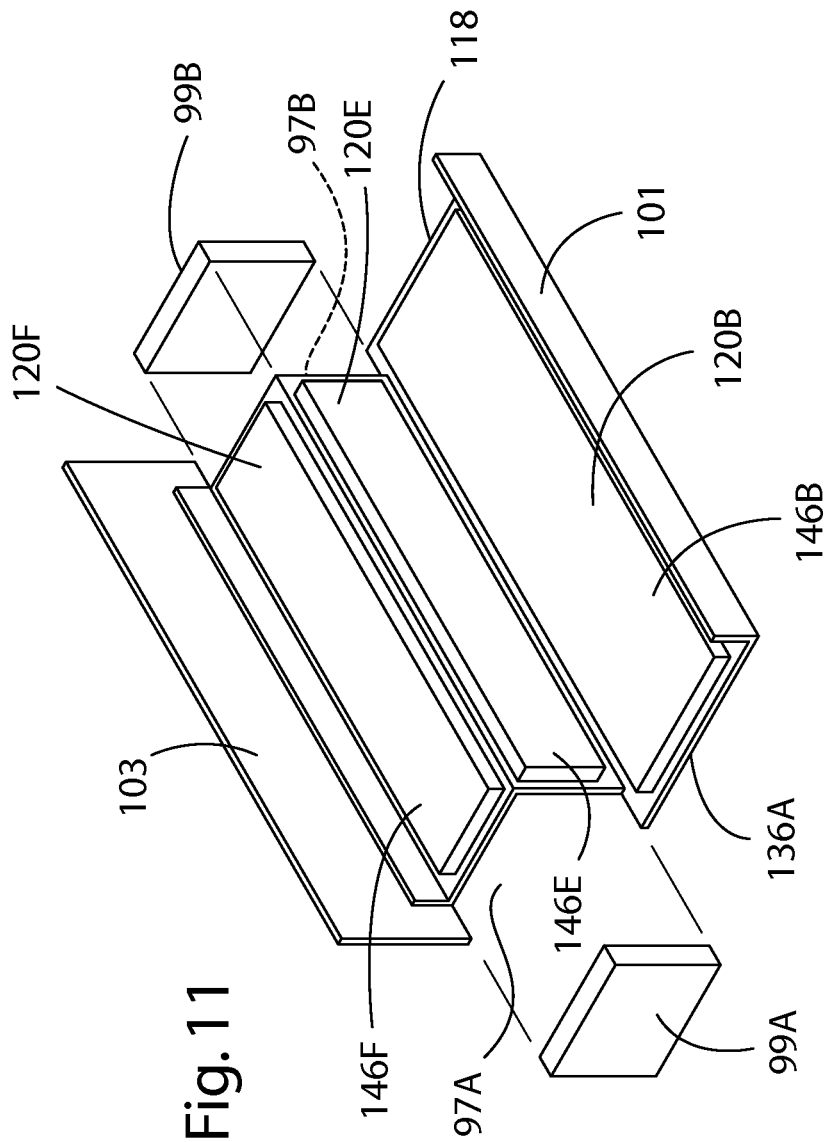
FIG. 11 is an exploded isometric view of a portion of the vacuum insulated structure of FIG. 10.

With further reference to FIG. 11, floor structure 118 may be formed from a separate blank 36A, and vacuum panels 120B, 120E and 120F may be formed at panel regions 146B, 146E and 146F. A front flange 101 may, when assembled, be connected to flange 78 of a liner 14 (FIG. 2), and an upright rear flange 103 may be connected to rear panel wall 16B. Panels 99A and 99B may be secured to the floor structure 118 to close off open ends 97A and 97B of exterior space 28A. The panels 99A and 99B may include one or more apertures (not shown) to provide for routing of utility lines from a compressor or other cooling system component disposed in exterior space 28A to a location within the interior space 119 of insulated cabinet structure 102. As discussed above, rear panel 16B may comprise a panel structure having inner and outer side walls with a polyurethane foam insulating material disposed in an interior space of the panel 16B. Utility lines from a compressor or other component disposed in exterior space 28A may be routed within panel 16B to an evaporator, fan, and/or other such components disposed within divider 88. A liner 14 (FIG. 2) may be inserted into interior space 119 (FIG. 10) of vacuum insulated cabinet structure 102.

FIGS. 12-19 show additional embodiments of refrigerators according to the present invention. FIGS. 12 and 13 show a refrigerator 201A, FIGS. 14 and 15 show a refrigerator 201B, FIGS. 16 and 17 show a refrigerator 201C, and FIGS. 18 and 19 show a refrigerator 201D. The insulated cabinet structures 202A-202D of refrigerators 201A-201D respectively, may comprise vacuum insulated cabinets constructed as described in more detail above in connection with FIGS. 1-11. Alternately, the insulated cabinet structures 202A-202D may include conventional insulation such as polyurethane foam or the like. The refrigerators 201A-201D include partitions 288A-288D that include cooling modules 290A-290D that provide independent cooling for compartments 210A-210D and 220A-220D formed on opposite sides of the partitions 288A-288D. For example, the compartments 210A-210D may comprise fresh food compartments that are maintained at a first temperature that is above freezing, and the compartments 220A-220D may comprise freezer compartments that are maintained at a temperature below freezing. Openings 205A-205D may be formed in the insulated cabinet structures 202A-202D to provide for venting of heated air produced by the cooling modules 290A-290D.

Refrigerators 201A-201D may include exterior spaces 228A-228D that are substantially similar to the space 28 described in more detail above in connection with FIGS. 1-9. A compressor (not shown) may be mounted in the spaces 228A-228D of refrigerators 201A-201D, and coolant lines (not shown) may be routed to the cooling modules 290A-290d through the insulated cabinet structure 202 as described in more detail above in connection with FIGS. 1-11. Alternately, the cooling modules 290A-290D may include a compressor, such that the compressor is not mounted in the external spaces 228A-228D. Alternately, cooling module 290A may comprise a thermoelectric cooling unit that does not include a compressor, such that substantially all of the components can be mounted within the modules 290A-290D.

With reference to FIGS. 12 and 13, refrigerator 201A includes an upper fresh food compartment 210A, and a lower freezer compartment 220A. With reference to FIGS. 14 and 15, refrigerator 201B includes a fresh food compartment 210B and a freezer compartment 220B that are disposed in a side-by-side configuration. With reference to FIGS. 16 and 17, refrigerator 201C includes an upper freezer compartment 220C and a lower fresh food compartment 210C. With reference to FIGS. 18 and 19, refrigerator 201D includes a fresh food compartment 210D and a freezer compartment 220D. Refrigerator 201D also includes a third compartment 225D. The third compartment 225D may be maintained at a third temperature that is not equal to the temperatures of compartments 210D and 220D. Third compartment 225D may be operably connected to compartments 210D and/or 220D by powered "air doors" (not shown) in partitions 288D and 214D. The air doors may be configured to open as required to permit airflow between third compartment 225D and compartments 210D and/or 220D to thereby control the temperature of third compartment 225D. The temperature of third compartment 225D may also be independently controlled utilizing other known arrangements.

The invention claimed is:

1. A method of fabricating a vacuum insulated cabinet structure, the method comprising:
   providing a first sheet of material, the first sheet comprising a metal layer and a thermoplastic polymer material, wherein the metal layer has sufficient stiffness to form a self-supporting freestanding cabinet structure when deformed;
   providing a second sheet of material, the second sheet comprising a barrier layer capable of maintaining a vacuum;
   positioning porous filler material between the first and second sheets;
   sealing the first and second sheets together around the porous filler material to form an airtight space containing the porous filler material.

2. The method of claim 1, including:
   providing a vacuum in the airtight space; and
   bending the first sheet of material to form a vacuum insulated cabinet structure.

3. A method of fabricating a vacuum insulated cabinet structure, the method comprising:
   providing a first sheet of material, the first sheet comprising a metal layer and a thermoplastic polymer material on a first side of the first sheet, wherein the metal layer has sufficient stiffness to form a self-supporting freestanding cabinet structure when deformed;
   providing a second sheet of material, the second sheet comprising a barrier layer capable of maintaining a vacuum;
   providing a plurality of pouches having porous filler material disposed in the pouches;
   positioning the pouches between the first and second sheets;
   sealing the first and second sheets together to form a seal line that extends around the pouches to form an airtight space containing the pouches;
   providing a vacuum in the airtight space;
   bending the first sheet of material to form a vacuum insulated cabinet structure.

4. A method of fabricating a vacuum insulated cabinet structure, the method comprising:
   providing a first sheet of material, the first sheet comprising a metal layer and a thermoplastic polymer material on a first side of the first sheet, wherein the metal layer has sufficient stiffness to form a self-supporting freestanding cabinet structure when deformed;
   providing a second sheet of material, the second sheet comprising a barrier layer capable of maintaining a vacuum;
   positioning porous filler material between the first and second sheets;
   sealing the first and second sheets together around the porous filler material to form an airtight space containing the porous filler material;
   providing a vacuum in the airtight space;
   bending the first sheet of material to form a vacuum insulated cabinet structure.

5. The method of claim 4, wherein:
   the first and second sheets are sealed together in a vacuum chamber.

6. The method of claim 4, wherein:
   the first and second sheets are sealed together utilizing a heat sealing process that includes heating at least one of the first and second sheets of material to form a seal line that extends around the porous filler material.

7. The method of claim 4, wherein:
   the second sheet comprises at least first and second layers, the first layer comprising thermoplastic material, the second layer comprising polymer material that forms a barrier with respect to at least one of oxygen, nitrogen, and water vapor; and
   the porous filler material is disposed in a plurality of pouches that are positioned between the first and second sheets prior to sealing the first and second sheets together.

8. The method of claim 4, including:
   thermoforming the second sheet of material to define a retaining structure that includes a generally planar central sidewall portion having a perimeter, and edge sidewall portions extending transversely from the perimeter, the retain structure further including a peripheral edge flange including outwardly from the edge sidewall portions.

9. The method of claim 8, including:
   positioning the peripheral edge flange in contact with the thermoplastic polymer material of the first sheet; and
   heat-sealing the peripheral edge flange to the thermoplastic polymer material.

10. The method of claim 6, including:
    forming a second airtight space between the first and second sheets of material, wherein at least one seal line extends between the two airtight spaces;
    bending the first sheet of material in an area between the two airtight spaces.

11. The method of claim 10, including:
    forming a third air-tight space between the first and second sheets of material;
    bending the first sheet of material to a structure define at least three generally planar sidewalls.

12. The method of claim 11, wherein:
the three panel sidewalls define spaced apart upright sidewalk and a horizontal upper wall extending between the side walls; and including:
forming a floor structure that extends between and interconnects the upright sidewalls;
securing a rear panel to the upright sidewalls, the horizontal upper wall, and the floor structure to form a primary cabinet structure that defines a forwardly-opening compartment.

13. The method of claim 12, including:
forming a polymer liner;
positioning the polymer liner in the compartment; and
providing a thermosetting foam insulating material between the polymer liner and the primary cabinet structure.

14. The method of claim 4, wherein:
the vacuum insulated cabinet structure comprises an insulated refrigerator cabinet structure.

15. The method of claim 4, wherein:
the metal layer comprises low carbon steel; and
the thermoplastic polymer material is laminated to the metal layer.

16. The method of claim 4, wherein:
providing a vacuum in the airtight space includes positioning the first and second sheets of material and the porous filler material in a vacuum chamber prior to sealing the first and second sheets together.

17. The method of claim 4, wherein:
providing a vacuum comprising forming a vacuum in the airtight space occurs prior to bending the first sheet of material to form a vacuum insulated cabinet structure.

18. The method of claim 4, wherein:
the porous filler material is disposed in a plurality of individual pouches that are positioned on the first side of the first sheet prior to sealing the first and second sheets together.

19. The method of claim 4, wherein:
the first sheet of material forms an outer cabinet skin blank, the blank including an elongated portion having a generally rectangular perimeter with elongated side edges and end edges extending between the side edges, the blank defining a plurality of bend lines extending between the side edges to define a plurality of generally planar panel regions; and
bending the cabinet skin blank along the bend lines to form a vacuum insulated cabinet structure having upright outer sidewalls and a transverse wall extending between the outer sidewalls.

20. The method of claim 4, including:
movably mounting a door to the vacuum insulated cabinet structure; and
connecting an electrically powered cooling system to the vacuum insulated cabinet structure to cool an interior space thereof.

* * * * *